INVENTOR.
Louis A. Thompson
BY J. D. Douglas
His Attorney

Sept. 26, 1950 L. A. THOMPSON 2,523,400

FACSIMILE TRANSMITTER AND RECEIVER

Filed Oct. 1, 1945 10 Sheets-Sheet 2

INVENTOR.
Louis A. Thompson
BY J. D. Douglass
His Attorney

FACSIMILE TRANSMITTER AND RECEIVER

Filed Oct. 1, 1945 10 Sheets-Sheet 3

INVENTOR.
Louis A. Thompson
BY
J. D. Douglas
His Attorney

Sept. 26, 1950 L. A. THOMPSON 2,523,400

FACSIMILE TRANSMITTER AND RECEIVER

Filed Oct. 1, 1945 10 Sheets-Sheet 4

INVENTOR.
Louis A. Thompson
BY J. D. Douglas
His Attorney

Sept. 26, 1950 L. A. THOMPSON 2,523,400

FACSIMILE TRANSMITTER AND RECEIVER

Filed Oct. 1, 1945 10 Sheets-Sheet 5

INVENTOR.
Louis A. Thompson
BY
J. W. Douglas
His Attorney

INVENTOR.
Louis A. Thompson
BY
J. W. Douglas
His Attorney

Sept. 26, 1950 L. A. THOMPSON 2,523,400

FACSIMILE TRANSMITTER AND RECEIVER

Filed Oct. 1, 1945 10 Sheets-Sheet 7

INVENTOR.
Louis A. Thompson
BY J. D. Douglas
His Attorney

FACSIMILE TRANSMITTER AND RECEIVER

Filed Oct. 1, 1945 10 Sheets-Sheet 8

INVENTOR.
Louis A. Thompson
BY
J. W. Douglas
His Attorney

INVENTOR.
Louis A. Thompson
BY
J. D. Douglas
His Attorney

INVENTOR.
Louis A. Thompson
BY
J. W. Douglas
His Attorney

Patented Sept. 26, 1950

2,523,400

UNITED STATES PATENT OFFICE 2,523,400

FACSIMILE TRANSMITTER AND RECEIVER

Louis A. Thompson, Rocky River, Ohio, assignor to NEA Service, Inc., Cleveland, Ohio, a corporation of Delaware Application October 1, 1945, Serial No. 619,451

6 Claims. (Cl. 178—6.7)

This invention relates to improvements in apparatus for the transmission of pictures by wire or radio, and more particularly to an improved transceiver for facsimile transmission.

In the transmission of pictures by wire or radio, the picture to be transmitted is usually secured to a drum, by wrapping the picture around the drum, and the picture scanned in a helical path. The scanning is effected by shining a beam of light upon the surface, which light is reflected into a photoelectric cell that produces a current, the amplitude of which depends upon the amount of light reflected by the light and dark areas of the picture. The current from the photoelectric cell therefore contains the intelligence which is picked up from the picture and this current may be used to modulate a carrier wave which is then transmitted to the desired point of reception. The receiver receives the modulated carrier which is used to control the operation of an exposure device that exposes a negative or a positive, the material exposed also being secured to a similar drum, and the exposure likewise being in a helical path.

The drum may rotate in a fixed position, and the scanning device travel longitudinally of the drum to provide the desired helical scanning, or the drum may rotate and simultaneously travel longitudinally, the scanning device remaining in a fixed position.

The present invention has to do with an improved mechanical system where the drum rotates in a fixed position and the scanner moves longitudinally thereof.

In an apparatus of the character about to be described, one of the greatest problems is to provide means which will provide the proper scanning or, as is commonly known, a scanning line which is not effected by anything except the desired signal. It is particularly desirable to provide a "clean" scanning line in the transmission of pictures which are used for reproduction in newspapers. Many things occur in such an apparatus which tend to effect the "cleanness" of a picture; among the more prominent troubles are those due to mechanical deficiencies of the apparatus. Slight irregularities in the drive for the drum may show up in the picture; the same is true of the lead screw which drives the scanner.

Since these machines are often portable, and since the construction is somewhat delicate, it also becomes desirable to make the machine accessible for service thereon. Heretofore but little thought was given to the service problems which occur in a highly complicated device, with the result that certain of the parts were relatively inaccessible, and the replacement or repair thereof was a problem which could only be solved by one having had considerable training and experience.

Furthermore, in the prior devices, it was common practice to provide several units which were used in conjunction with each other to provide a complete transmission system.

By my present invention, I have made a combined transmitter and receiver for pictures which is unitary in construction requiring substantially only one piece of apparatus to effect the desired results.

The construction, further, is such that all of the electrical and mechanical parts are easily accessible for adjustment or service. The mechanical portion of the machine may be removed as a unit, making the same extremely accessible. The electrical circuit components are also removable as separate units. It is thus possible to remove any one of the units and replace it with a spare unit with substantially the same ease that a tube is removed from a socket.

My present machine is also adapted to send or receive a picture, either of which may be effected in complete daylight. Among the other advantages present in the invention, which will become more apparent as the description proceeds, is the improved means for supporting and moving the scanning mechanism.

Still other advantages of the invention, and the invention itself, will become more apparent from the following description of the embodiment thereof, which description is illustrated by the accompanying drawings and forms a part of this specification.

Figure 3:
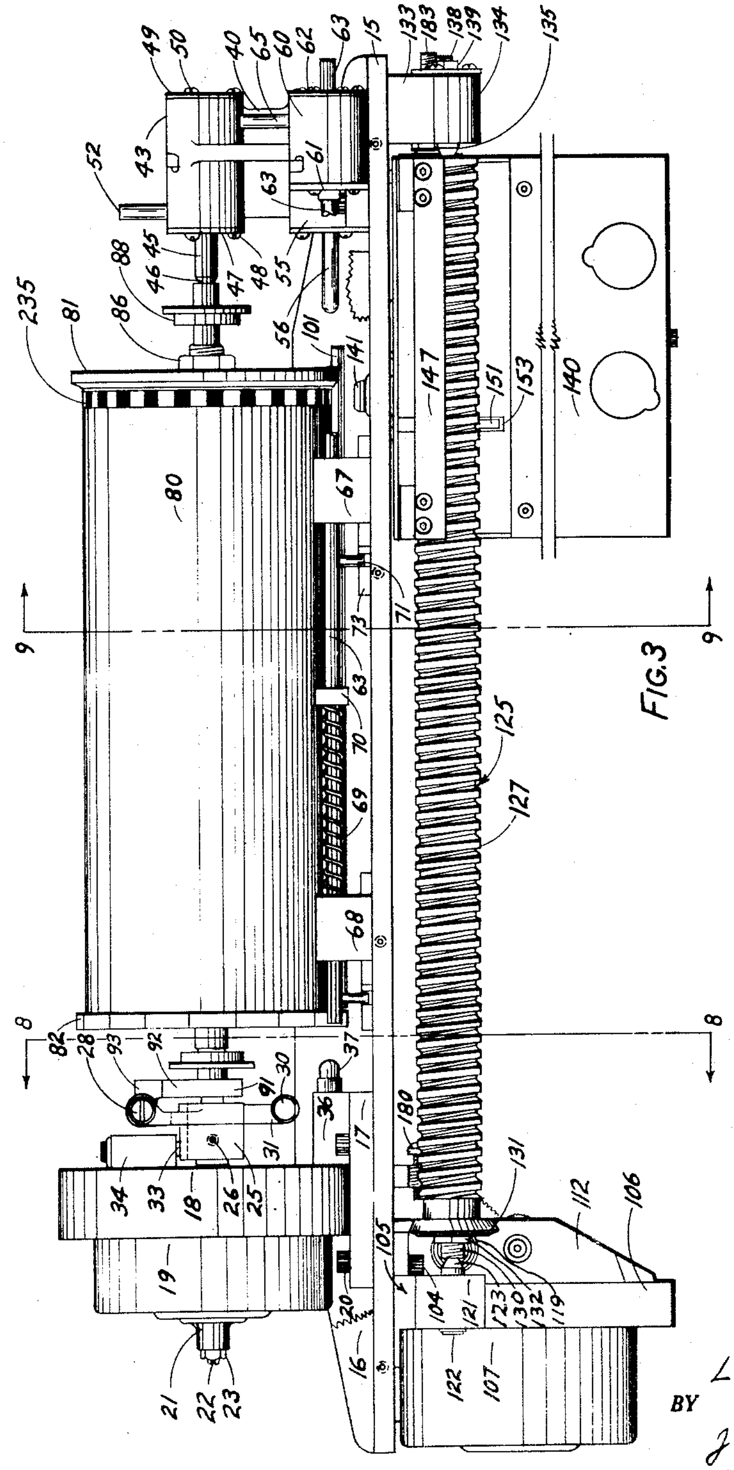
Fig. 3 is an elevational view of the mechanical apparatus removed from its housing.
Figure 3A:
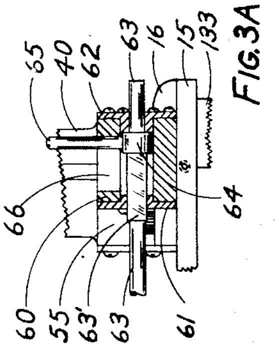
Figure 4:
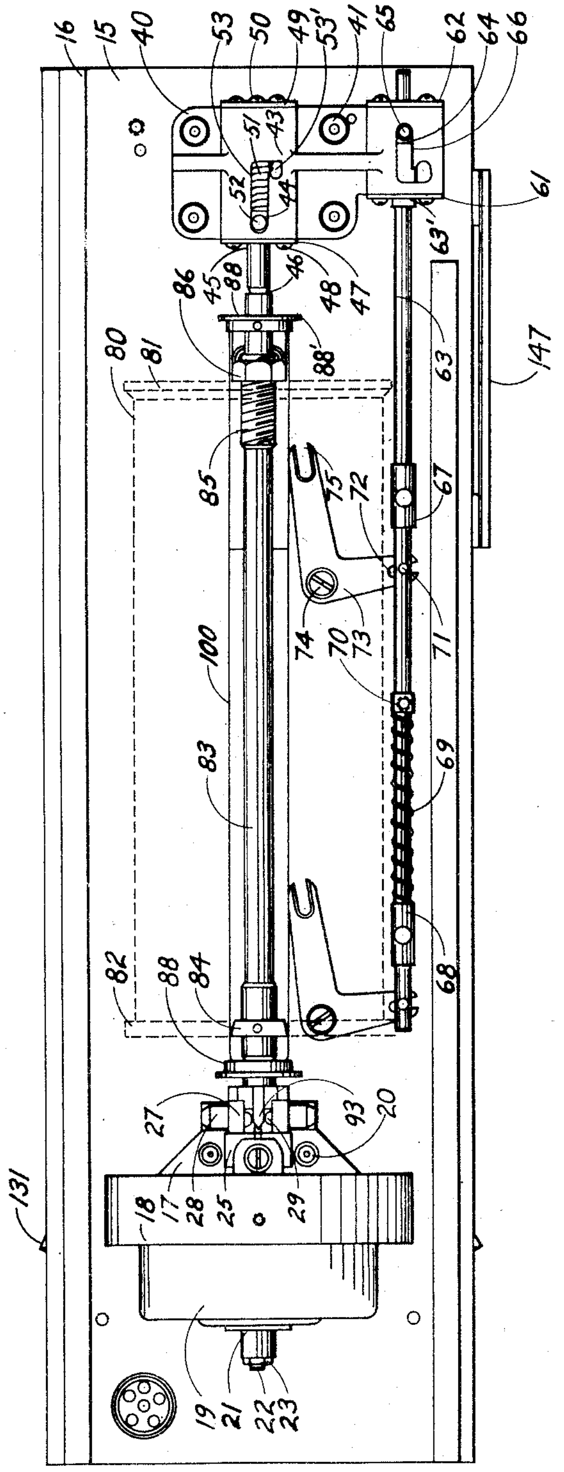
Figure 5:
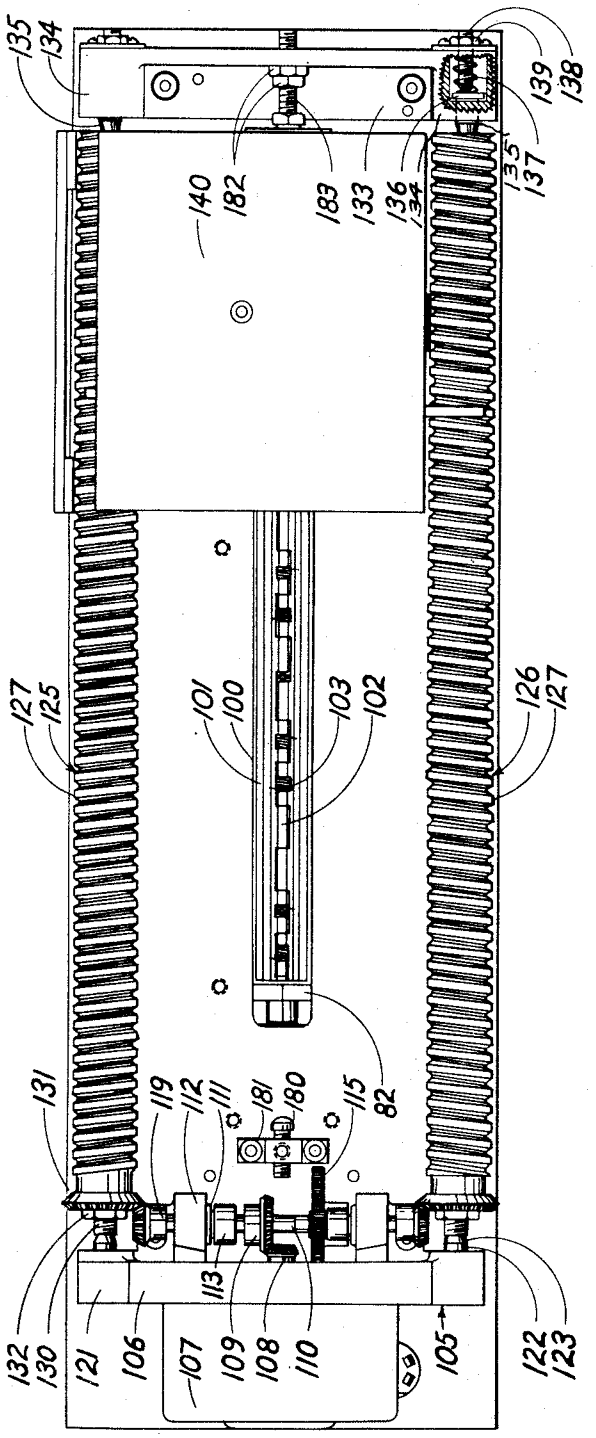
Figure 7:
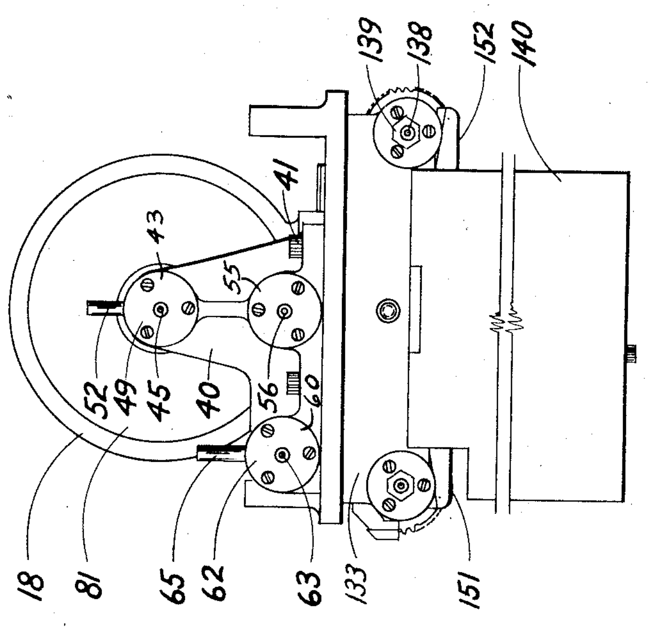
Figure 6:
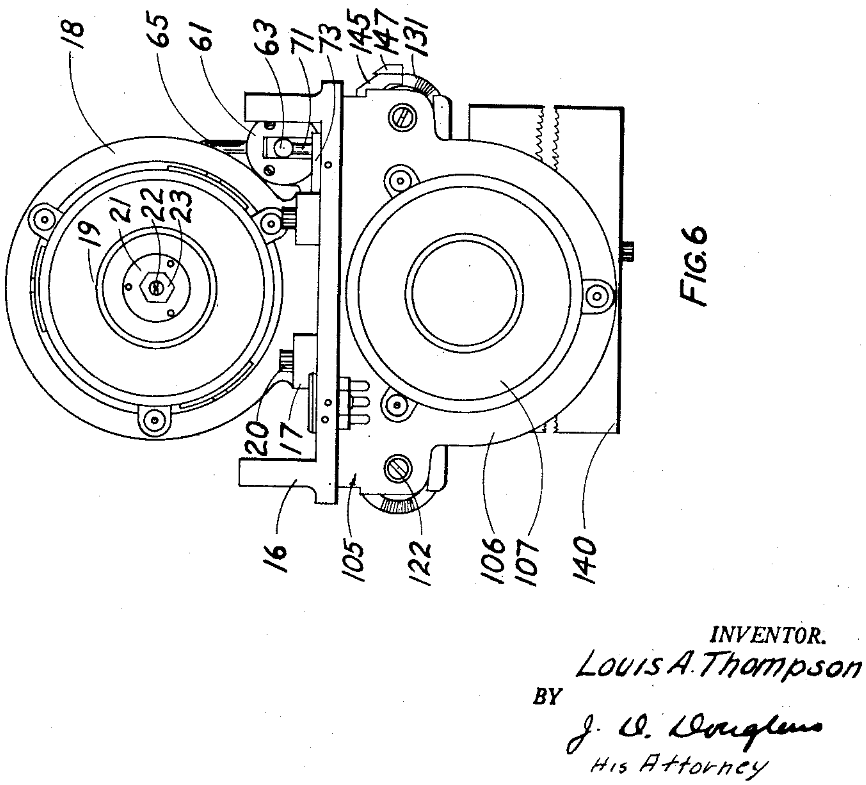
Figure 9:
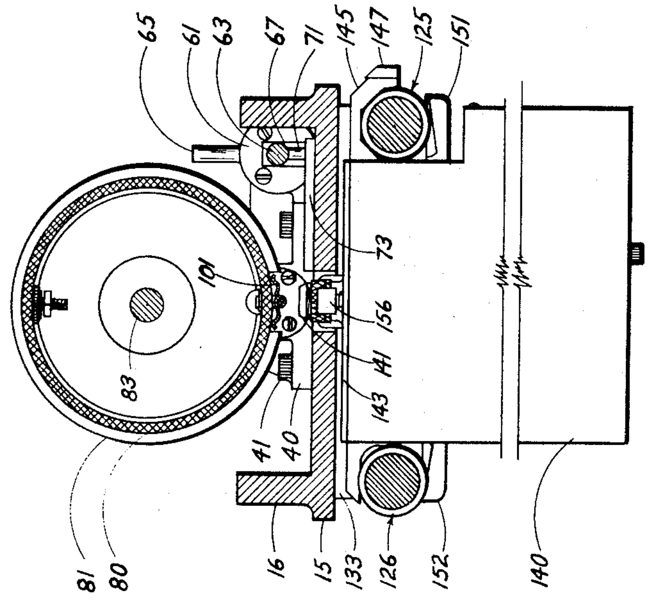
Figure 8:
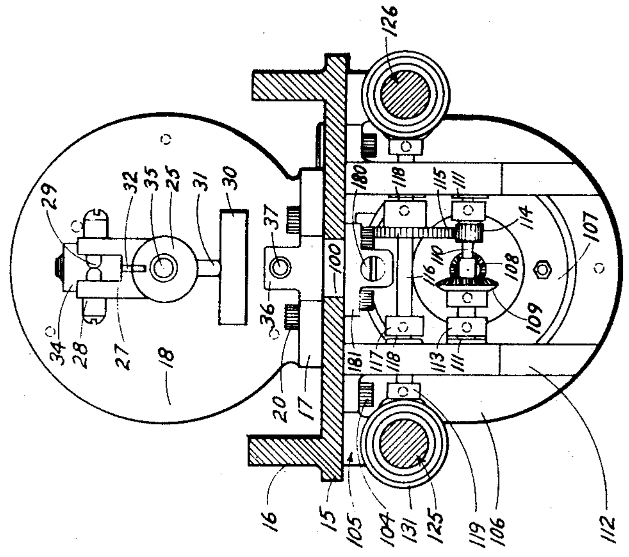

Fig. 3*a* is a fragmentary section of a portion of the apparatus of Fig. 3;

Fig. 4 is a plan view of the apparatus of Fig. 3 with the film or paper holding drum shown in phantom;

Fig. 5 is a bottom plan view thereof;

Figs. 6 and 7 are elevational views taken from the left and right ends respectively of Fig. 3;

Figs. 8 and 9 are sectional views taken from planes indicated by the lines 8—8 and 9—9 respectively of Fig. 3 and looking in the direction of the arrows; the drum being removed.

Figure 11:
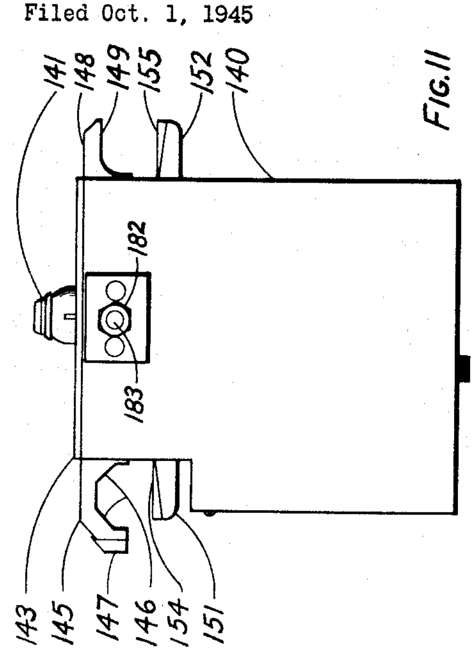
Figure 10:
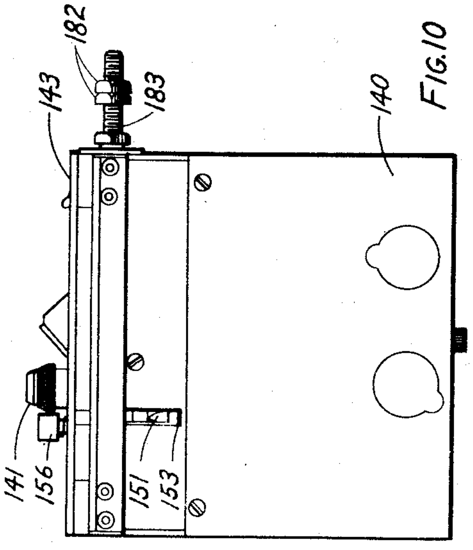
Figure 12:
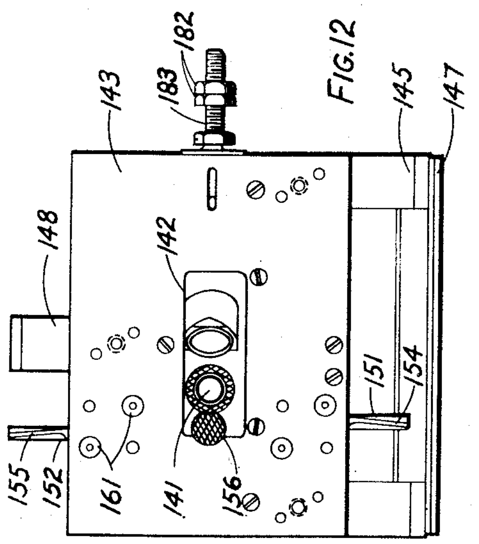
Figure 14:
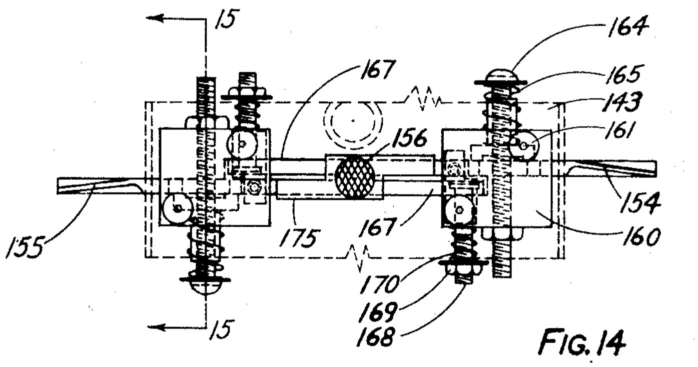
Figure 13:
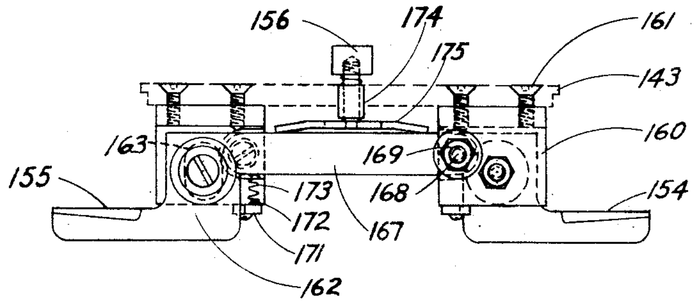
Figure 15:
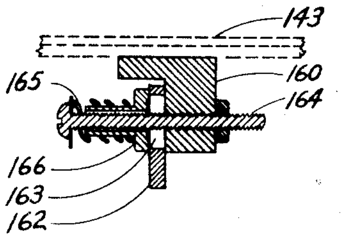
Figure 16:
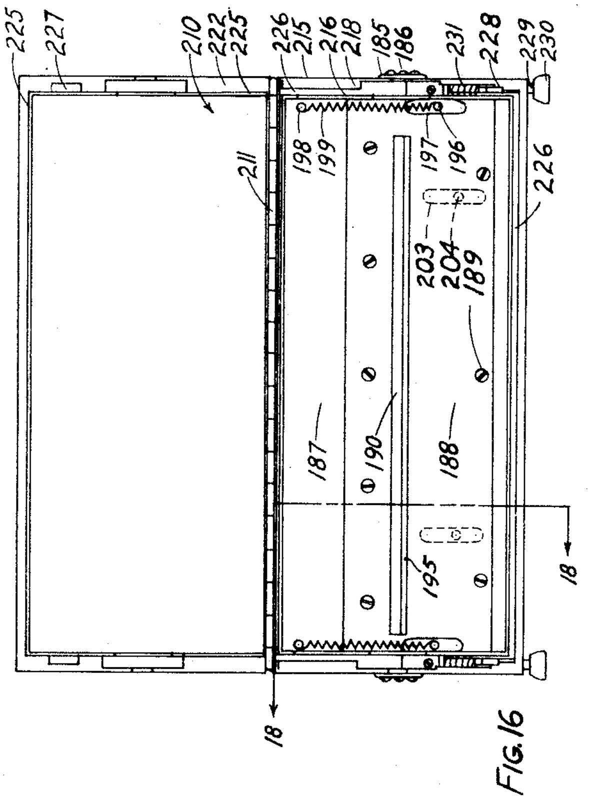
Figure 17:
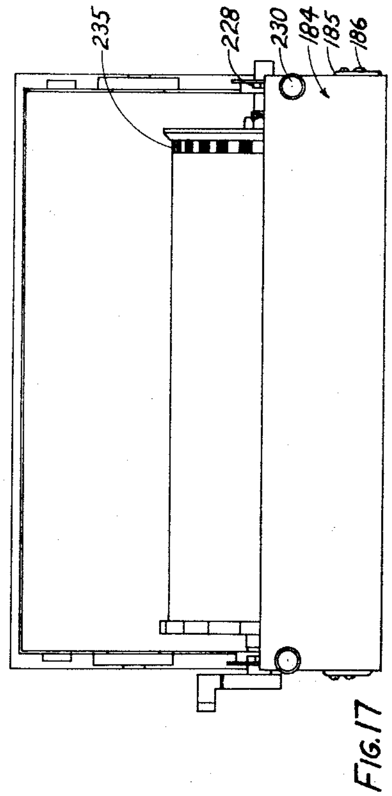
Figure 18:
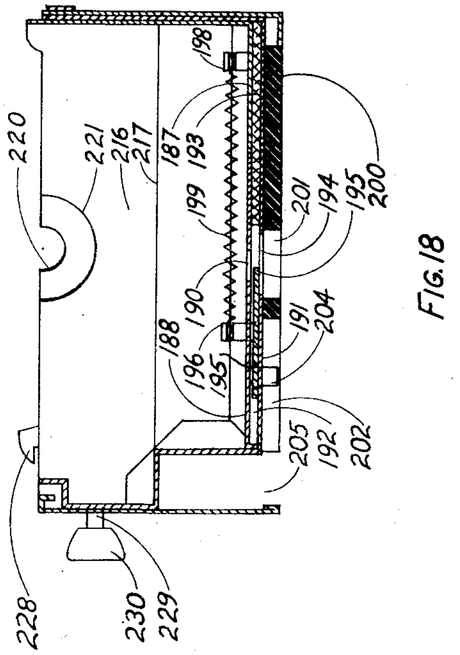

Figs. 10, 11 and 12 are side elevation, and elevation and top plan views respectively of the scanning unit used in the apparatus of my invention;

Fig. 13 is an elevational view of the wedge block mechanism removed from the scanning housing;

Fig. 14 is a plan view thereof;

Fig. 15 is a section taken on the line 15—15 of Fig. 14;

Fig. 16 is a plan view of a film and drum box with the drum removed, and showing the lid in a wide open position;

Fig. 17 is an elevational view with the lid half open and showing the film drum in position; and Fig. 18 is an enlarged section taken on the line 18—18 of Fig. 16.

Preferably, my invention includes a housing having an inclined forward panel on which the operating controls and indicators are mounted. The mechanical assembly is supported in the top of the machine and in the rear of the control panel. At the rear of the housing, each of the electrical circuit components, such as picture amplifier, lamp supply, multi-vibrator, and power supply, are removably supported in drawers which can quickly and easily be removed from the cabinet.

Although the invention about to be described particularly adapts itself to use in the apparatus shown, it will be appreciated that many of the components are useful in other places than this particular combination; for instance, the manner of supporting the optical unit or scanning head is clearly adaptable to machines of the general type but specifically different than the one illustrated.

Figure 1:
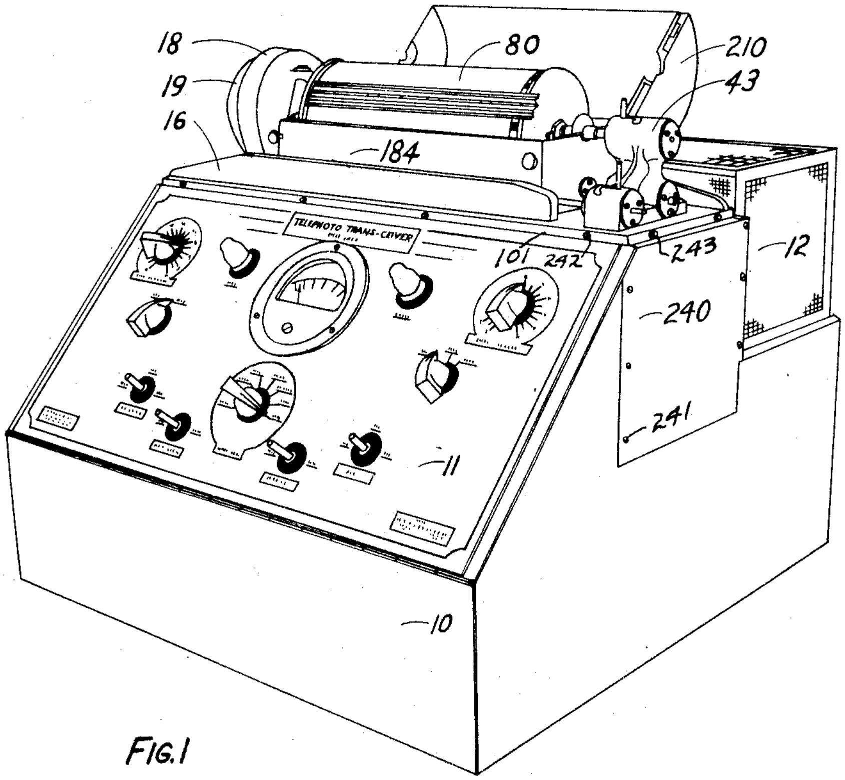
Fig. 1 is a perspective view of a complete machine embodying my invention.

Referring now to the drawings, throughout which like parts have been designated by like reference characters, the assembled machine is shown in Fig. 1 and includes a casing 10 provided with a sloping front panel 11 on which is mounted the various controls. The panel 11 may be hingedly secured at its lower end to the front of the housing if desired, thus making the unit more accessible. Just to the rear of the front panel and seated in the top of the housing is the mechanical unit which is more clearly illustrated in Figs. 3, 4 and 5.

Figure 2:
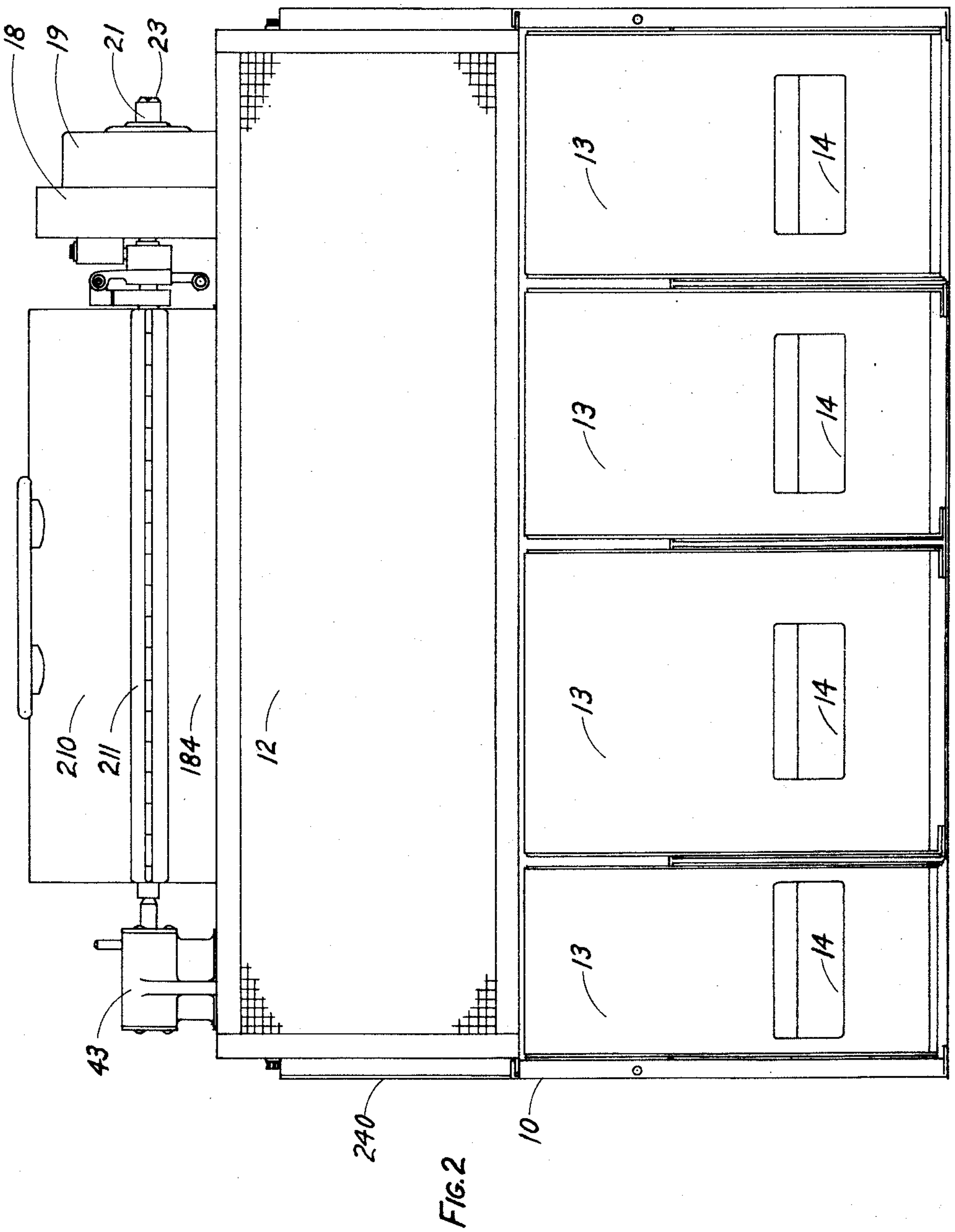
Fig. 2 is a rear elevational view of the machine of Fig. 1.

As shown in Fig. 2, the electrical component drawers 13 are disposed in the rear of the housing being provided with handles 14 for removing the same. A ventilated cover and protector for the tubes is provided at 12.

The unit is supported by engagement of the edges of the bed upon angular flanges 101 at the top of the housing and may be removed by removing the plate 240, whichever is held into the side of the housing by screws 241, and by removing the studs 242 which extend through the flange 101 into the edge of the bed. After the screws 241 and 242 are removed, the entire unit may be slid outward through the opening, left by the plate 240. Access to the unit for minor adjustments may also be had by tilting the panel 11 forward on its hinge.

Referring to Figs. 3, et seq., wherein the mechanical unit is shown removed from the casing, it will be seen to comprise a base or bed 15 with the picture drum and its associated drive supported above the bed and the scanner head and its drive supported below the bed. The bed is of rectangular formation and is provided with a pair of longitudinally extending ribs 16 which rise from the bed adjacent the front and rear edges. The ribs strengthen and add rigidity to the bed.

The drum is supported and rotatable on the base in much the same manner that a piece of work would be supported between live and dead centers of a lathe.

The drum drive unit is disposed on the left end of the bed and includes a support bracket 17 which is provided with a cylindrical housing 18 in which the drum drive motor 19 is secured. The bracket is secured to the base by studs 20 which extend through the bracket and are threaded into the base. The motor 19 is provided with a housing 21 coaxial with the motor shaft that protrudes from the left end of the motor as viewed in the figures, which carries an adjusting thrust screw and lock nut 22 and 23 that may be adjusted to absorb the end thrusts upon the motor.

The end of the motor shaft extends through the housing 18 and carries thereon a drive clutch which includes a cylindrical body or hub 25 secured to the motor shaft by a set screw 26. A pair of spaced parallel arms 27 extend from the body as can best be seen in Fig. 8. The arms carry housings 28 in which are disposed spring pressed plungers 29 that extend toward and into engagement with each other when the drum is removed (Fig. 8). The weight of the arms 27 and its associated mechanism is counterbalanced by the weight 30 suspended from the body 25 by the arm 31.

The hub or body 25 may be of insulating material and provided with a contact segment 32 which makes contact at a predetermined point in the revolution of the drum with a brush 33 carried in the boss 34 on the housing 18. The center of the hub 25 is provided with a substantially conical live center 35 adapted to support the shaft of the drum, as will hereinafter more clearly appear.

The bracket 17 is provided with a boss 36 in which is secured a film box locator pin 37 adapted for engagement with the film box later described. The pin may be adjustable if desired to enable the longitudinal position of the film box to be properly determined.

The apparatus thus described provides a resilient drive for the drum and a support for the end of the drum which also determines its longitudinal position; and a means for determining the position of the film and drum box when it is used for the reception of a picture. The other end of the bed 15 is provided with a bracket 40 which carries the support for the other end of the drum, the film and drum having a latch operating mechanism for opening the exposure window in the film and drum box. The bracket is secured to the base by screws 41 which extend through the bracket and are threaded into the base.

The bracket 40 is provided with a cylindrical housing 43 that has a smooth cylindrical bore in which a dead center, that includes a cylindrical body 44 and a pin 45 having a conical end 46 is disposed. The cylindrical portion is disposed in the bore, and the pin 45 extends out through an opening in an end plate 47 which is secured on the end of the housing by screws 48. The other end of the pin extends through the cylinder and out the opening in a cap 49 on the end of the housing, which cap is secured thereon by screws 50. The pin 45 is thus supported and guided in its movements by the body 44 which engages the interior of the housing, and by engagement of the pin 45 with the walls of the opening in the caps 47 and 49. A helical spring 51 is provided in the housing between the body 44, and the cap 49, which holds the dead center to the left is viewed in Fig. 4. The body 44 is provided with a control pin or handle 52 which extends radially from the body through a J-shaped slot 53 in the housing. This pin provides a convenient control for the dead center, enabling the operator to move the same to the right, as viewed in the figures, compressing the spring 51. The pin 52 is guided in its movement by the slot 53 and when moved into the toe 53' of the slot enables the dead center to be held in its retracted position against the pressure of the spring 51.

Directly below the housing 43 is a second housing 55 which is substantially the same as just described. It also is provided with a spring pressed plunger comprising a body for engagement in the bore and a pin 56 which is guided by the walls of the openings in the end slots. It does not have an operating handle. This plunger cooperates with the fixed pin 37 to hold the film box in its proper position.

A third housing 60 for controlling the film box shutter operating mechanism is provided at the lower forward end of the bracket 40 or to the left as viewed in Fig. 7. This housing is likewise provided with end caps 61—62, and a rod 63 is journalled in the caps. A ring 64 is rotatably journalled on the rod and guided by the bore in the housing, which ring is provided with an operating pin 65 extending through and guided by the J-shaped slot 66 in the housing.

The rod 63 is provided with a square portion 63' which is slidable in a square opening in the cap 61, thus permitting free longitudinal movement thereof but preventing rotation.

The ring abuts the shoulder formed at the junction of the square and round parts of the rod and may exert thrust to the rod to move the same longitudinally.

As can best be seen in Fig. 4, the rod 63 extends longitudinally of the base and is guided and supported by the spaced supports 67 and 68 on the base 15. A helical spring 69 is disposed around the rod 63 with one end abutting the support 68 and the other end engaging the adjustable collar 70 carried on the rod. The spring 69 thus holds the rod 63 toward the right as viewed in the figures, with the square portion exerting thrust against the ring 64.

The rod 63 is provided with a pair of pins 71 which extend downward toward the base and are engaged in the forks 72 of bell crank levers 73 pivotally secured to the base at 74 and which are provided with film box shutter opening forks 75 for cooperation with shutter operating pins hereinafter more fully described.

The picture drum comprises a cylindrical body 80, which may be of fiber or other material, provided with end bells 81 and 82 on the tail and head ends respectively. Preferably, the end bells are separate from the drum proper and are clamped to the drum by the spindle 83 (Fig. 4) which is provided with a frustro-pyramidal collar 84 secured on the shaft engaging a complimentary opening in the center of the end bell 82, and the other end of which is provided with an enlarged threaded portion 85 with a nut 86 disposed thereon and in engagement with the outer surface of the end bell 81.

The spindle 83 extends beyond the ends of the drums and is provided with flanged collars 88 spaced from the end bells and adapted for cooperation with the film box to provide a light trap as will hereinafter more clearly appear. The spindle 83 at the end bell 81 extends beyond the collar 88, and the end is provided with a center bore adapted for engagement with the end 46 of the dead center.

The other end of the spindle at the end bell 82 extends beyond the collar 88 and is provided with a center hole adapted for engagement in the live center 35 of the hub 25. Secured to the spindle between the collar 88 and the end is an L-shaped dog which includes the body portion 91 having an arm 92 that is provided with a laterally extending knife edge projection 93 adapted to be engaged between the members 29.

By this construction the drum may be quickly and easily placed in position in the machine. When placing the drum in the machine, the dead center 46 is first retracted by sliding the operating handle 52 to the right in the slot 53, compressing the spring 51 and locked in its retracted position by moving it downward into the toe 53' of the slot. The end of the spindle 83 is engaged with the center 35, the knife blade 93 being engaged between the plungers 29, which it pushes apart. The other end of the spindle 83 is then lined up with the tail stock or dead center 46 which is secured by moving the lever 52 out of the slot 53', and the spring 51 presses the dead center into its proper holding position for the end of the spindle. The drum is thus held between the live and dead centers, and the drive is effected from the hub 25 through the arms 27 and the spring pressed plungers 29 to the knife blade 93 and thence to the spindle 83. The drum may be removed by moving the dead center to its latched position previously described and withdrawing the knife blade 93 and the spindle 83 from its connection with the drive.

The scanning mechanism scans the picture or exposes a picture on the drum from below the bed through a slot 100 which extends longitudinally of the bed directly below the drum.

Briefly, the scanning mechanism is supported as a unit below the bed on a pair of lead screws. The drum is provided with a pair of clamp bars 101 for holding the picture or light sensitive material which is to be exposed, which bars extend longitudinally of the drum and comprise a pair of leaves hingedly secured to the drum at 102 and held pressed against the surface of the drum by springs 103 disposed around the hinge pin for the leaves. The ends of the leaves 101 may extend beyond the end bell 81 which is notched to allow their passage and provides a convenient means for operating the same. The sheet of film or picture is secured to the drum by inserting one edge under one leaf 101 which is raised to permit the insertion thereof and the material is then wrapped around the drum and held by inserting the opposite edge under the other leaf.

As previously mentioned, the scanning mechanism is disposed beneath the bed 15; actually, the lead screws which drive the scanner also furnish the support therefor. The lead screws in turn are driven by a motor through a suitable gearing.

As can best be seen from Figs. 3, 5, 6, and 8, there is provided a bracket 105 which is suspended below the head of the bed 15, being secured thereto by screws 104. The bracket is provided with a generally circular housing 106 which supports a synchronous motor 107 on the left of the bracket as viewed in Fig. 3. The shaft of the motor extends through the bracket and is provided with a small bevel drive gear 108 on its end, which bevel gear is in mesh with a second larger bevel gear 109 carried by a countershaft 110 journalled in bearings 111 carried by vertically extending spaced parallel ribs 112 on the right side of the housing. The collar 113 and the hub of the gear 114, which are secured to the shaft, determine the proper location thereof. The countershaft 110 also carries a small spur gear 114 which is in mesh with a large spur gear 115 carried on a second countershaft 116 journalled in bearings 118 above the first countershaft. The collar 117 and the hub of the gear 115 determine the position of the shaft. The shaft 116 extends through the ribs 112 and carries bevel gears 119 on its opposite ends.

The bracket 105 is provided with a pair of bosses 121 on opposite sides in which are adjustably disposed lead screw bearing pins 122. The lead screw pins provide a journal for one end of each lead screw, the pins being provided with a conical end 123 adapted to be seated in a center bore in the lead screw.

The lead screws are of right and left hand pitch and are rotated in opposite directions by the gears 119. More specifically, as can best be seen in Fig. 5, the lead screws 125 and 126 each comprise a rod, the lead screw 125 being provided with a right hand thread and 126 with a left hand thread, which threads have the sides accurately ground. The apex of the thread is ground off to provide a helical land 127 which extends the length of the lead screw. This land is also accurately ground to provide a smooth surface. The thread provides the means for driving the scanner, and the land the means for supporting the scanner, as will hereinafter more clearly appear.

Each lead screw is provided with a threaded end 130 which receives the bevel gear 131 held on by the nut 132, which gear meshes with and is driven by the gear 119.

The other end of the bed, to the right, as viewed in Figs. 3 and 5, is provided with a downwardly extending bracket 133 having bosses 134 that support centers 135 which engage in center bore in the lead screws. The centers comprise the spindle 135 which extends into the cylinder 134 and is provided with a head 136 slidably journalled in the cylinder and against which a helical spring 137 bears, the other end of the spring engaging the end of the cylinder. These centers are limited in their movement by screws 138 which are locked in position by lock nuts 139.

The centers are thus spring loaded and are limited in their movement by the screws 138 which are preferably adjusted to provide a gap between the end of the screw and the head 136, but which gap is not large enough to allow the lead screw to be dropped out of its bearings in event the thrust to the right is sufficient at any time to compress the spring 137.

The lead screws are thus supported under spring loaded conditions between centers on opposite sides of the bed, under the bed, and in closely spaced relation therefrom. They are adjustable longitudinally whereby the meshing of the gears 119—131 which afford the driving connection may be properly effected to provide a smooth drive. It should be noted that the construction is such that gears of different ratio, particularly the spur gears 114 and 115, may be substituted if desired to effect a change in desired lead screw speed. In the present instance, the total desired reduction is 20:1, but this can be varied to increase or decrease the ratio.

The scanning unit is illustrated apart from the other apparatus in Figs. 10, 11 and 12. It comprises a housing 140, of generally square formation and is provided with a scanning head 141, the objective of which projects upwardly through an opening 142 in the top plate 143 of the scanning unit, the unit being mounted flush with the surface of the plate. The supports for supporting the scanning head on the lands 127 are best shown in Figs. 11 and 12 and comprise a pair of generally hook shaped brackets or V-blocks 145 extending outwardly from the top plate 143 on the opposite ends, the inner surface of which is provided with flat bearing surfaces 146 for tangential engagement with the surface of the lands. The two brackets are tied together by a bar 147. A third bracket, or L block 148, is provided on the opposite side being disposed substantially midway between the ends and having a flat bearing surface 149 on its under side for tangential engagement with the land on the other lead screw. The bearing surfaces of the V and L blocks are accurately machined and ground to provide a smooth running contact with the lands of the lead screws, and preferably are of sufficient width that they bridge at least two convolutions of the lands.

The drive for the scanning unit is provided by a pair of wedge blocks which extend from opposite sides of the scanner and engage in the threads of the lead screws. As shown in Fig. 12, the wedges are indicated at 151 and 152 respectively and extend laterally from opposite sides of the scanner through openings 153, the wedges being provided with knife edges 154 and 155 respectively of the proper pitch and angle to engage with both sides of the lead screws.

The wedges are normally held in spring pressed engagement with the lead screws but may be realesed from engagement therewith by pressing downward on the knurled release button 156.

For a more detailed understanding of the operation of the wedges, reference is had to Figs. 13, 14 and 15. The plate 143 is provided with a pair of spaced brackets 160 disposed on the under side thereof adjacent opposite edges. The brackets are of inverted L shape and may be secured to the under side of the plate 143 by screws 161 which extend through the plate 143 and are threaded into the bracket 160.

Each of the wedges comprise an L-shaped body 162, the toe of which has formed thereon the screw engaging surfaces 154—155, and the body of which is provided with a vertically extending slot 163 permitting the same to be guided in its movement on the bracket by a screw 164, which is threaded into the bracket and locked in place by a nut. The screw is provided with a slidable collar having a base 166 engaged with the side of the block 162 and held frictional against the block by the spring which is disposed about the stem 166, the other end of the spring being in engagement with the screw head. The block 168 is provided with an arm 167 which extends from the upper edge of the block over to and is pivotally secured to the other bracket by a screw 168 which extends through the bracket and is held by the nut and spring 169 and 170.

The lower edge of the bracket is provided with a lug 171 secured thereon, which lug extends under the arms 167 and is provided with a pin 172 on which a spring 173 is seated, the other end being in engagement with the arm 167.

The other bracket and its supported wedge are constructed and supported in a like manner, except that it faces in the opposite direction, and the two arms 167 which extend across between the blocks being juxtaposed to each other.

The springs 173 hold the blocks in their upward position wherein the surfaces 154—155 engage with their respective screw threads. Release of the blocks from engagement with the screw threads is effected simultaneously by pressing the plunger 156 downward, the plunger being slidably journalled in a bushing 174 and provided with a foot 175 which rests on top of both of the arms 167. Downward pressure of the plunger causes the arms 167 to pivot downward about the pivots 168, and the springs 173 are compressed withdrawing the wedges from the lead screws and allowing the scanner to be slid freely on the lands of the lead screws. When the plunger is released, the blocks are forced upward, and the edges 154—155 engage with and are guided by the threads 125—126 on the lead screws. If desired, an additional spring may be disposed under the release button 156 normally holding said button in its uppermost position. Movement of the scanner on the lead screws is limited in its movement toward the head of the machine by the adjustable stop 180 carried in a bracket 181 on the bottom of the bed, and in its movement toward the tail of the machine by the lock nuts 182 on the screw 183 carried by the scanner and which is adapted to pass through an opening on the end bracket 133. Thus the limits of movement of the scanner may be adjustably determined.

The scanner is thus suspended from the V and L blocks which ride on the lands of the lead screws and the scanning mechanism, the objective of which views or exposes the picture through the slot 100 in the bed 15. The lead screws being revolved in opposite directions and the wedge blocks being in engagement with the lead screw, the scanner is moved at the desired rate of speed from one end of the bed to the other.

The device, as before mentioned, is adapted to send or receive pictures in the daylight or in a lighted room. Obviously, when receiving pictures, the material used is light sensitive, and, hence, provision is made to allow the exposure of the light sensitive material and to prevent unwanted light from reaching the film. This includes, generally, a film box which may (then) be loaded in a dark room and (which may) then (be) taken into a lighted room and secured in position in the machine. The drum is arranged to float freely in the film box when the film box is in position on the bed and the drum engaged between center, suitable light traps being provided to prevent light from gaining access thereto.

Fig. 16 is a top plan view of the film box with the drum removed, Fig. 17 is an elevational view with the drum in position, and Fig. 18 is a sectional view through the lower part of the film box.

The lower portion 184 of the film box is of generally rectangular formation and is provided with plates 185 secured to the ends of the box by screws 186. The plates have recesses in which the locator pins 37 and 56 may be engaged when the box is placed in position on the bed 15, to properly determine the position of the box on the bed.

The bottom of the box is formed with spaced parallel walls having openings therethrough, through which the film may be exposed; a shutter is provided to close the openings and prevent light from leaking in when the box is removed from the bed. The bottom of the box is provided with the inside bottom wall formed in two parts 187 and 188, the part 188 being removable and held in place by screws 189. This part being provided with a longitudinally extending slot 190. A second bottom wall is provided at 191 which is spaced from the false bottom to provide a shutter containing chamber 192. The chamber 192 extends from the forward side of the box past the opening 190 and 194, and the remainder of the space between the two walls is provided with a slot 194 that is larger in all dimensions than the slot 190; the mid portions of the slots, however, being in alignment with each other.

The shutter slide 195 is slidably disposed in the chamber 192 adapted to close the openings 190—194; in the drawings, the slide is shown half way closed, although in practice, it would automatically be closed when the box is removed from the bed. When completely closed, it extends over both slots into engagement with the filler between the bottoms 187—191 and into the space between the false and bottom wall adjacent the opening.

In Fig. 1, the film box is shown in position with the cover open. In this case, the drum is revolved to a position where the clamp bars may be seen. In Fig. 2, which is a rear view of the machine, the film box is shown closed as it would be when loaded with unexposed film.

The shutter is formed of a flat strip of metal being provided with pins 196 at the ends which extend upward through slots 197 in the removable bottom part 188. Connected between these pins and pins 198, secured to the bottom 187, are springs 199 which normally urge the slide to a closed position.

The slide is opened and closed by the forks 75 on the bell crank lever 73 under control of the hand lever 65 (Fig. 4). In carrying out this aspect of the invention, the sides of the box project downward below the bottom to leave a space under the bottom. A rubber gasket 200 is secured to the bottom, being provided with an opening 201 in register with the openings 190 and 194. This gasket is ground off substantially flush with the bottom edges of the sides of the box and is adapted to engage with the upper surface of the bed and provide a light tight seal therewith. The ribs 16 also help to shield the connection against direct light. The bottom of the box is provided with a pair of slots 203 through which pins 204, carried by the slide extend. The pins are adapted to be engaged by the forks 75.

Directly adjacent the forward edge of the box, a pocket or channel 205 is formed which provides clearance space for the slide operating rod 63 and its supports.

Prior to the time of placing the film box on the bed, the slide control rod 63 is in the normal position shown in Fig. 4 where the rod is urged to the right by the spring 69, and the forks 75 are in their inward position. When the box is seated on the bed, the pins 204 enter the slots 75 of the bell cranks 73. At this time, the slide or shutter is closed. After the film box is properly seated and engaged between the locating pins 37 and 56, the shutter may be opened by moving the lever 65 to the left as viewed in Fig. 4 and locked open during reception by moving it downwardly into the toe of the slot. To close the shutter, it is merely necessary to release the lever 65.

The cover 210, as shown in Figs. 1 and 2, is curved to conform to the cylindrical drum and is secured to the upper edge of the face by a piano hinge 211.

The end walls of the bottom portion of the box are formed with double walls adjacent their upper edge which cooperate with the members 88 on the drum spindle to provide a light trap which prevents light from entering into the film box around the spindle and fogging the picture during picture reception.

In this respect, there is provided the outer wall 215 and an inner wall 216 spaced therefrom, which inner wall extends downward to a point spaced from the bottom as indicated at 217 and is bent over and secured to the outer wall (Fig. 18). The outer wall is provided with an inwardly extending flange 218 which extends inwardly but stops in spaced relation to the inner wall to provide a gap therebetween which extends around the three sides. The outer wall is provided with a notch 220 semi-circular in form and large enough to provide clearance space for the drum spindle 63 beyond the flange member 88. The inner wall is provided with a semi circular notch 221 sufficiently large to provide clearance space for the drum flange 88. The cover is formed in a like manner except that the flange 222, which corresponds to the flange 218, extends over and meets with the inner wall. The portion of 218 adjacent the notches 220—221 is removed to provide clearance space for the member 88 and its peripheral flange 88'. The cover is provided with a flange 225 on three sides, which extends beyond the outer wall and the inturned flange 222, and which is adapted to enter into the slot 226 formed by the gap between the flange 218 and the inner wall 216 when the cover is closed. The flange 222 on the cover is also provided with an opening or notch 227 in which the locks 228 may engage. The locks 228 may comprise latches or hooks which are mounted on rods 229 that extend through the front of the box and are provided with operating buttons 230. The rods are held in their forward position by springs 231. It will be apparent that the light trap feature just mentioned may take other specific forms than that shown and that the same is true of the locks for locking the box closed.

In operation, when it is desired to transmit a picture, the wedge releasing button 156 is depressed to release the wedges from the lead screws and the scanner is slid to the right until the stop nut 182 engages with the bracket 133. In this position, the apparatus is ordinarily adjusted so that the scanner scans the alternate black and white squares 235 which provide signals of maximum and minimum intensity to allow the adjustment of the receiver gain at the receiving end. The drum, with the picture attached, may be secured in position by moving the lever 52 to the left and locking it. This moves the dead center to the right and out of the way. Next, the drum is lowered to position where the end of the spindle 63 is aligned with the live center 35 on the hub 25. The drum is then moved to the left, and the end and the blade 93 respectively are simultaneously inserted in the opening 35 and between the plungers 29. The other end of the drum spindle is then lined up with the tail stock, and the lever 52 is released to cause the dead center to engage in the center hole in the end of the spindle 83.

The drum is now in position where the motor 17, when energized, may rotate it in the manner described.

The motors 19 and 107 are energized from a source of power of predetermined frequency, and the drum and lead screws are simultaneously rotated. The scanning unit is supported on the rotating lands, and the wedge block being engaged in the screw thread. The scanner is moved to the left at a predetermined speed, scanning the picture on the drum in a helical path. Preferably, the pencil of light which falls on the picture is of such a size and is so proportioned relative to the rotation of the drum and the movement of the scanner that there is substantially no overlap.

At this point, it is pointed out that the structure lends itself ideally to the handling of pictures with different degrees of fidelity. In other words, the structure is such that either the lead screws or the gear or both may be changed, as well as the size of the light beam from the scanner, and the machine can thus be adapted to scan either 100 or 300 lines per inch to provide medium or extremely high fidelity pictures. It should be understood, however, that the foregoing is only by way of an example, and that the number of lines per inch may be varied as desired by the changes mentioned.

It will also be apparent that the moving parts, the operation of which has a direct bearing upon the fidelity obtained in the picture, lend themselves to a construction where great accuracy may be maintained in a relatively simple manner. It should be noted particularly that ball, needle, or roller bearings have been eliminated. This thus eliminates the necessity of extremely expensive bearings and with the concomitant irregularities which have a tendency to disturb the fidelity of the scanning line. Further, with the elimination of the bearings, the structure is such that the friction is reduced because of the manner in which the parts are operated. This is particularly true of the scanner since the actual bed on which the scanner slides comprises the rotating lands. Since these lands are rotating, and are ground very accurately, they provide a smooth travel for the scanner. The wedge blocks only serve to move the scanner and because the lead screw may also be ground with a high degree of accuracy, this also tends to increase the over all accuracy of operation and hence provides a high fidelity to the pictures.

When it is desired to receive a picture, the light sensitive material is first mounted on the drum, and the drum placed in position in the light box, which is then locked. This obviously takes place in a dark room or other suitable place where the operation may be effected without fogging the film.

The loaded film box may then be taken out into the daylight and placed in position on the machine. In performing this operation, the tail stock is locked in its released position, moving the dead center out of the way. The shutter operating lever is released to the position shown in Fig. 4. The film box is then placed on the bed with the right end against the spring plunger 56, which being spring pressed, may be moved to the right by moving the film box to the right. The left end of the film box is then lowered and moved to the left, the plate 185 on the film box engaging with the locator pin 37; simultaneously, the spindle 83 and the blade 93 are guided into proper engagement as previously described. Next, the tail stock is released which allows the dead center to engage the drum spindle. Previously, the scanner had been moved to the proper position. When it is desired to receive, the shutter is opened by the lever 65.

After the picture is received, the film box and drum are removed by simply reversing the above described process, after which it may be taken to the dark room and developed.

It will be noted that the controls for opening the shutter in the film box being separable from the shutter in the film box prevents accidental opening of the film box while it is off of the machine. Furthermore, in event the operator should fail to close the shutter after receiving a picture and before removing the film box, the actual removal of the film box wherein the pins 204 disengage from the fork 75, automatically releases the shutter which is then snapped to a closed position by the springs 199.

The structure, therefore, provides a quick manner for loading the drum. It also provides for carrying out most of the operating in a light place rather than the dark room. Nearly continuous reception of pictures may be had by having a supply of loaded film boxes on hand.

As previously stated, the structure also lends itself to the solution of service problems when they occur. The mechanical assembly is removable as a unit by removing the plate 240 at the end of the cabinet and sliding the assembly out of the cabinet, after which all of the parts are accessible for adjustment or repair. The electrical components are even more expediently removed by simply pulling out the drawer which houses that particular component in whichever trouble develops. This lends itself to quick service in the field by substituting of components which are known to be functioning properly and thus eliminating laying up a complete machine for repairs.

Access to the back of the panel 11 may be had by simply moving the upper edge of the panel forward on its hinge. This also allows access to the underside of the mechanical assembly if desired.

Having thus described my invention, I am aware that numerous and extensive departures may be made therefrom without departing from the spirit or scope of the invention as defined in the appended claims.

I claim:

1. A facsimile transmitter and receiver including a bed, a pair of supports on said bed, and a drum rotatably carried between centers in said supports, means for rotating said drum, a pair of lead screws rotatably carried by said bed below the bed, each lead screw comprising a smooth cylindrical surface and a spiral lead groove formed in said surface, said lead grooves being of opposite pitch and means to rotate said lead screws in opposite directions, said drum adapted to carry a picture to be transmitted or a material to receive a picture, scanning means for scanning said picture or placing a picture on said material including an optical unit, arms on said optical unit disposed in engagement with the cylindrical surface on said lead screws, said optical unit being suspended from said lead screws, and means carried by said optical unit for engagement with said grooves and operable upon rotation of the lead screws to move the optical unit longitudinally of said bed.

2. A facsimile transmitter and receiver including a bed, a pair of supports on said bed, and a drum rotatably carried between centers in said supports, means for rotating said drum, a pair of lead screws rotatably carried by said bed below the bed, each lead screw comprising a smooth cylindrical surface and a spiral lead groove formed in said surface, said lead grooves being of opposite pitch and means to rotate said lead screws in opposite directions, said drum adapted to carry a picture to be transmitted or a material to receive a picture, scanning means for scanning said picture or placing a picture on said material including an optical unit, arms on said optical unit disposed in engagement with the cylindrical surface on said lead screws, said optical unit being suspended below said bed, and means carried by said optical unit for engagement with said grooves and operable upon rotation of the lead screws to move the optical unit longitudinally of said bed, said bed being formed with a longitudinally extending opening opposite said drum and said optical unit adapted to scan or expose said picture through said opening.

3. A facsimile transmitter and receiver comprising a bed, a pair of supports carried by said bed at the ends thereof, a drum for holding a picture or a material to receive a picture rotatably journalled between centers on said supports, at least one of said centers being movable for quick release and removal of said drums, means to rotate said drums, means for scanning said picture or for placing a picture on said material including an optical unit, a pair of members rotatably journalled on said bed and each having a smooth cylindrical surface interrupted by a lead groove, said lead grooves being of opposite pitch and means for rotating said lead screws in opposite directions, said optical unit having a pair of V blocks extending from one side and an L block extending from the opposite side, said V and L blocks being provided with smooth flat surfaces for tangential engagement with said smooth surfaces on said lead screws and said optical unit being supported by said blocks on said lead screws, a movable wedge block carried by said optical unit and movable into and out of engagement with the walls of said grooves in said lead screws, said bed being formed with a longitudinally extending opening and said optical unit having means to scan or expose pictures on said drum through said opening.

4. A facsimile receiver and transmitter including a bed, supports on said bed at opposite ends thereof, centers carried by said supports in coaxial alignment with each other, a drum for holding a picture or a material adapted to receive a picture rotatably carried by said centers, said bed being formed with a longitudinally extending opening below said drum, means for scanning a picture on said drum or placing a picture on said material including a pair of members rotatably supported below said bed in spaced parallel relation to each other and to said drum, each of said members comprising a smooth cylindrical surface and a lead groove interrupting said surface, said lead grooves extending helically lengthwise of said member and being of right and left hand pitch respectively, an optical unit having portions for sliding engagement on said smooth cylindrical surfaces, said portions having smooth flat seat surfaces for tangential engagement with said cylindrical surfaces and of sufficient width to bridge at least one convolution of said groove and suspended from said member below said opening in said bed, and means carried by said optical unit adapted for driven engagement in said grooves, said optical unit adapted to operate on said picture through said opening in said bed.

5. A facsimile transmitter and receiver including a housing, a panel on the front of the housing hingedly connected thereto, said housing formed to provide a support on its upper end, a frame removably secured in said support and comprising a bed, a drum for holding a picture or a film rotatably supported above the bed, an optical unit movably supported below the bed for scanning pictures from below the bed, said housing being provided with removable drawers at the rear thereof, said drawers containing some of the electrical component for the transmitter and receiver and quickly removable therefrom.

6. A facsimile machine including a frame, a rotatable cylinder supported on said frame adapted to support a picture or a film, means to rotate said cylinder connected thereto, a scanning unit for scanning or exposing a picture on said drum, means to wholly support and move said scanning unit longitudinally of said drum comprising a pair of members disposed in spaced parallel relation to each other and to longitudinal axis of the drum carried by said frame, said members having a smooth cylindrical surface and screw means formed below said surface, said scanning unit having means for tangential engagement with said cylindrical surface and means for engagement with said screw means, drive means for said members including a reduction gearing having removable and replaceable gears and a motor connected to said members by said gearing, said members being removable from said frame and spring means for holding said members in spring loaded condition on said frame.

LOUIS A. THOMPSON.

REFERENCES CITED

The following references are of record in the file of this patent:

UNITED STATES PATENTS

| Number | Name | Date |
|---|---|---|
| 1,105,906 | Hess | Aug. 4, 1914 |
| 2,120,989 | Pfannenstiehl | June 21, 1938 |
| 2,158,391 | Wise | May 16, 1939 |
| 2,164,038 | McFarlane | June 27, 1939 |
| 2,182,115 | Carlson | Dec. 5, 1939 |
| 2,185,139 | Wurzburg | Dec. 26, 1939 |